No. 654,517. Patented July 24, 1900.
M. M. CHEW.
NEST BOX.
(Application filed Mar. 6, 1900.)
(No Model.)
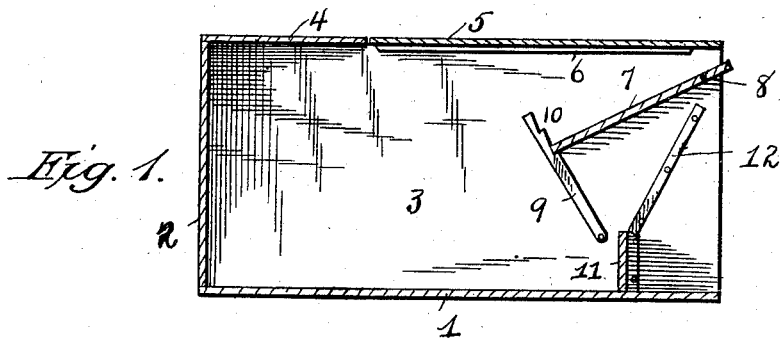
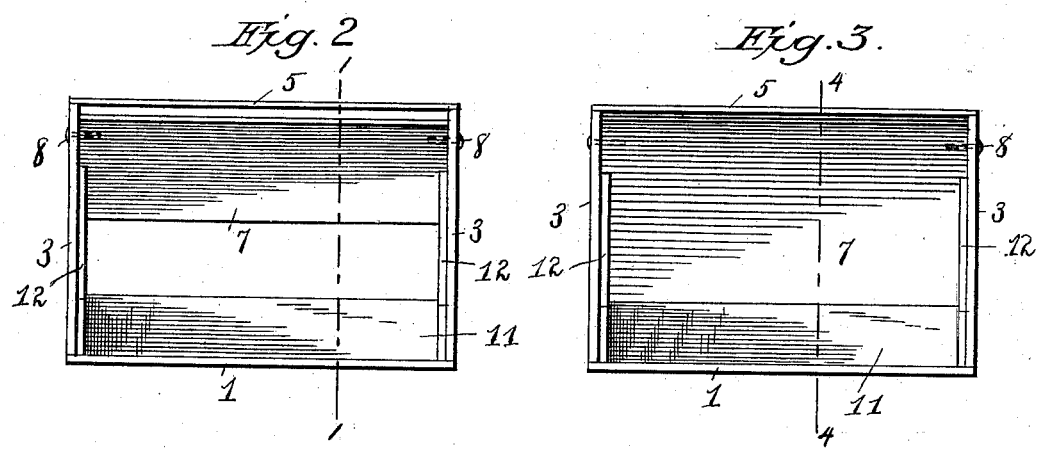
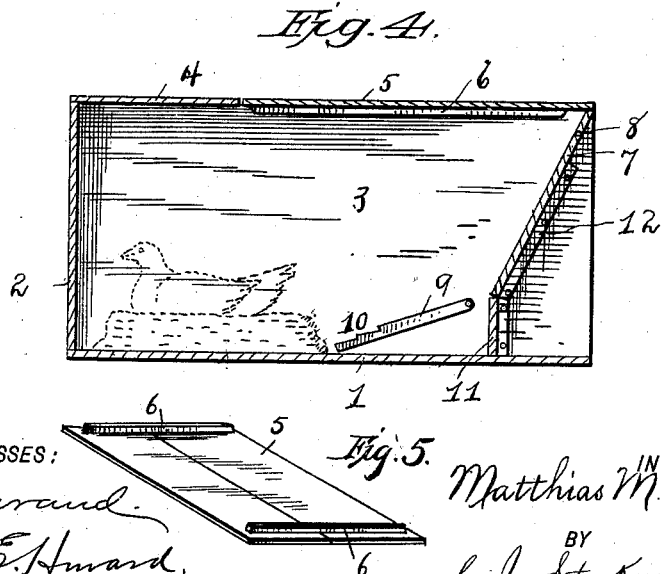
WITNESSES:
F. L. Ourand.
George E. Howard.
INVENTOR
Matthias M. Chew
BY
C. J. Stockman
ATTORNEY

UNITED STATES PATENT OFFICE.

MATTHIAS M. CHEW, OF CECIL, NEW JERSEY.

NEST-BOX.

SPECIFICATION forming part of Letters Patent No. 654,517, dated July 24, 1900.

Application filed March 6, 1900. Serial No. 7,611. (No model.)

*To all whom it may concern:*

Be it known that I, MATTHIAS M. CHEW, a citizen of the United States, residing at Cecil, in the county of Gloucester and State of New Jersey, have invented certain new and useful Improvements in Nest-Boxes; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to that class of nest-boxes constructed to entrap the hen automatically when she enters the box and keeps her confined therein until released by the poultryman at the time her egg is collected, thus enabling the poultryman to "pedigree" the chickens, observe accurately the results of matings, and ascertain definitely the number of eggs laid by each individual hen in the flock.

The aim of this invention is to supply the demands and needs of poultrymen and farmers for a simple, cheap, and thoroughly-reliable nest-box which will entrap a hen that has entered it and prevent her from leaving it until her egg has been collected and during her occupancy of the box will bar access thereto of any other fowl. In accordance with this object I have constructed a nest-box of the kind stated which is characterized by the fact that it requires in its structure no springs whatever and no devices operated by the weight of the hen to entrap her and keep others out during her occupancy of the box. The leading features of construction consist of a box having at its entrance a pivoted door capable of swinging inward only and a pivoted device which engages said door and holds it normally in open position. The door and said device form mutual supports in the positions they occupy when adjusted to permit a hen to enter the box, and the position then is such that the door is struck and raised out of engagement from said device by a hen which is entering the box. When the door is thus disengaged from said device, the latter falls out of the path of said door, so that the door may close when the hen has passed beyond it. The door is made close, whereby when it is closed a solid front to the box is presented, thus concealing the nest within the box, which is all usually that need be relied upon to prevent a hen entering the box when the latter is closed; but as an additional precaution an immovable front strip is placed across the front of the box beneath the door which will be struck by a hen in her attempt to enter when the door is closed. A door to be lifted by the poultryman is provided in a suitable place through which he has access to the interior of the box for the purpose of lifting the hen from the box, collecting the egg laid by her, and marking on said egg the number appearing on her leg-band.

The preferred construction of nest-box having the above features is shown in the accompanying drawings, in which—

Figure 1 is a vertical longitudinal section through line 1 1 of Fig. 2. Fig. 2 is a front view of the nest-box open to the entrance of a hen. Fig. 3 is a front view of the nest-box, showing the position of the door when the box is occupied. Fig. 4 is a vertical longitudinal section through line 4 4 of Fig. 3, and Fig. 5 is a view of a suitable form of door provided to give the poultryman access to the interior of the box.

The same numerals of reference designate the same parts in the several figures.

The body of the box preferably consists of a bottom 1, a rear wall 2, side walls 3, and a top 4, having a door 5. Any construction of box, however, will answer, provided it is open at the front and will prevent the hen leaving through the sides, top, and rear after she has laid an egg. The door 5 is preferably located in the top, as shown; but it may be otherwise located, if desired. It can be hinged, but I prefer that it be not attached to the box, so that it may be freely removed therefrom when desired, and that it have cleats 6 on its under side to engage the side walls of the box and assist in holding it in place.

7 designates the door by which when open the hen has access to the box. This door is pivoted at or near its upper end 8 and, as hereinabove stated, is so constructed that it will conceal the nest when closed. To hold the door in open position, I prefer to employ a latch 9, which is pivoted at its lower end to a side wall of the box and has a plurality of teeth 10 at its upper end to enable it to hold the door in different inclined positions. Extending across the lower end of the front of the box in position to be engaged by the lower edge of the door when the latter is closed is a strip 11, which is immovably held in place, and secured to the side walls of the box in position to be engaged by the side edges of the closed door are strips 12, which prevent the door from swinging outward, and thus confines the hen within the box.

When the door 7 is open, it inclines inward from its upper end and is engaged at its lower end by one of the teeth 10 on the latch, which latter inclines rearward from its lower end. Thus it will be seen that the door and the latch support each other. Through the space between the strip 11 and the lower edge of the door 7 the nest is exposed, which induces the hen to enter. In entering the box the hen raises the door out of engagement with the latch, and the latter immediately drops of its own accord out of the path of the door and into the position shown in Fig. 4, and after the hen has passed beyond the door the latter falls by gravity to its closed position and entraps the hen in the box and conceals her and the nest from the view of outside fowls. As the nest is concealed and a closed box is presented when the nest is occupied, there is at such time no invitation offered to a hen to enter the box for the purpose of laying therein. With many hens this will be a sufficient bar to the occupancy of the box by two hens at once; but the instinct of other hens accustomed to using the box may lead them to seek to enter the box when the door is closed, and largely to provide against this possibility the immovable strip 11 is preferably made of such height that it will be struck by the hen in her attempt to enter the box when the door is closed. It has been found in practice that when a hen finds she cannot enter the closed box through the strip closing the lower end of the front she seeks an open box. Thus the hen on the nest remains in undisturbed possession, and the uncertainty entailed by the use of the nest by two hens at the same time is overcome without requiring spring-latches or other means for locking the door in closed position.

It will be observed that the box can be constructed at nominal expense and that in its construction skilled labor is not required, while it is entirely reliable in action and has no parts liable to get out of order. Wood is the only material that need be used in its construction, with the exception of the pivot-pins, for which ordinary wire nails are well adapted, and the nails securing the parts of the box together.

While a single box has been shown, it is obvious that they may be built in series without departing from the spirit of the invention.

Having thus described the invention, what I believe to be new, and desire to secure by Letters Patent, is—

1. A nest-box having a swinging door confined against opening outward and constructed to conceal the interior of the box when closed and a latch for holding the door in open position, said door and latch mutually supporting each other when engaged and said door being in position to be lifted out of engagement with the latch by an entering hen, substantially as described.

2. A nest-box having a swinging door confined against opening outward and constructed to conceal the interior of the box when closed, a latch for holding the door in open position, and an immovable strip across the bottom of the box, beneath the door, said door being in position to be forced out of engagement with the latch by pressure of an entering hen against it and said strip being of such height that a hen will engage it if she attempts to enter the box when the door is closed.

3. A nest-box having a swinging door confined against opening outward and constructed to conceal the interior of the box when closed, a latch for holding the door in open position, said door and latch mutually supporting each other when engaged and said door being in the path of an entering hen so as to be lifted out of engagement with the latch by her pressure, and an immovable strip extending across the bottom of the box, beneath said door, and being of such height that a hen will engage it if she attempts to enter the box when the door is closed.

4. A nest-box having an open front, an immovable strip across said front, a door pivoted at its upper end and confined against swinging outward, said door being constructed to conceal the interior of the box when closed and a latch pivoted at its lower end and having teeth at its upper end to engage the lower edge of the door, said door and latch inclining inwardly in opposite directions and mutually supporting each other when engaged, and said door being arranged in the path of a hen entering the box and operated by her pressure imposed directly thereon to disengage it from the latch, and said strip being of such height that a hen will engage it if she attempts to enter the box when the door is closed.

In testimony whereof I affix my signature in presence of two witnesses.

MATTHIAS M. CHEW.

Witnesses:
J. T. WOOD,
B. S. MOORE.